(12) United States Patent
Griebel et al.

(10) Patent No.: US 6,308,973 B1
(45) Date of Patent: Oct. 30, 2001

(54) SUSPENSION SYSTEM WITH AXLE OSCILLATION CIRCUIT

(75) Inventors: Francis J. Griebel; Daniel L. Harrington; Olen H. Gamble, all of Lexington, KY (US)

(73) Assignee: Link-Belt Construction Equipment Company, L.P., LLLP, Lexington, KY (US)

( * ) Notice: Subject to any disclaimer, the term of this patent is extended or adjusted under 35 U.S.C. 154(b) by 0 days.

(21) Appl. No.: 09/247,643

(22) Filed: Feb. 10, 1999

(51) Int. Cl.$^7$ ............................................. B60G 9/99
(52) U.S. Cl. ......................... 280/124.159; 280/124.158; 280/5.502
(58) Field of Search .................. 280/5.502, 5.508, 280/6.157, 124.111, 124.112, 124.159, 754, 755

(56) References Cited

U.S. PATENT DOCUMENTS

| | | | |
|---|---|---|---|
| Re. 035,168 | * | 3/1996 | Golpe ........................... 280/666 |
| 3,439,927 | | 4/1969 | Ryskamp . |
| 3,550,993 | | 12/1970 | Peiffer . |
| 3,792,748 | * | 2/1974 | Regier ........................... 180/104 |
| 3,953,040 | * | 4/1976 | Unruh et al. ........................... 280/6 H |
| 4,065,143 | | 12/1977 | Iida . |
| 4,090,723 | * | 5/1978 | Hart ........................... 280/6 H |
| 4,145,073 | | 3/1979 | McLuckie et al. . |
| 4,174,854 | | 11/1979 | Spicka et al. . |
| 4,205,864 | | 6/1980 | Hoefer . |
| 4,264,014 | | 4/1981 | Hogg et al. . |
| 4,270,771 | | 6/1981 | Fujii . |
| 4,279,319 | * | 7/1981 | Joyce, Jr. ........................... 180/12 |
| 4,393,959 | | 7/1983 | Acker . |
| 4,512,589 | | 4/1985 | Ambrose et al. . |
| 4,705,295 | | 11/1987 | Fought . |
| 5,005,858 | * | 4/1991 | Torrielli et al. ........................... 280/707 |
| 5,013,061 | | 5/1991 | Fujimura et al. . |
| 5,116,077 | * | 5/1992 | Karnopp et al. ........................... 280/707 |
| 5,117,950 | | 6/1992 | Kobayashi et al. . |
| 5,188,248 | | 2/1993 | Dohnalik . |
| 5,230,529 | * | 7/1993 | Harvey-Bailey ........................... 280/707 |

(List continued on next page.)

Primary Examiner—Eric Culbreth
Assistant Examiner—L. Lum
(74) Attorney, Agent, or Firm—King and Schickli PLLC

(57) ABSTRACT

A suspension system for a heavy duty crane, excavator or the like is provided with a transverse rear axle and semi-independent suspension by hydraulic cylinders. The cylinders are pivotally attached adjacent the ends of the axle to allow oscillation in a traveling mode simulating a bolster, center pinned type system. The extend sides of the cylinders transfer hydraulic oil through an exchange line to accommodate true oscillation movement. In a working mode, locking valves block the flow of oil between the cylinders to establish a stabilized platform. A hydraulic/pneumatic accumulator communicates with the exchange line in the travel mode for cushioning of the ride. A third locking valve in a bypass return line communicating with the retract sides of the cylinders blocks the oil flow back to the reservoir in the working mode, but upon release by the control circuit is opened to communicate with the reservoir and maintain back pressure to enhance oscillation and prevent cavitation. The set up valve differentially pressurizes the extend and retract sides of the cylinders to select and maintain a desired height during the working and traveling modes. The three locking valves are actuated by an electrical control circuit, which also includes an interrupter switch responsive to the movement of a component of the vehicle, such as a working boom. The support cylinders are mounted outboard of the main frame rails with the center of the axle being free of attachment and a pivotal 4-bar assembly provided to limit lateral movement of the axle. Components of the hydraulic oscillation circuit are mounted in the free space above the center of the axle.

13 Claims, 3 Drawing Sheets

U.S. PATENT DOCUMENTS

| | | | |
|---|---|---|---|
| 5,271,632 | * 12/1993 | Glaser et al. | 280/6.12 |
| 5,290,048 | * 3/1994 | Takahashi et al. | 280/6.12 |
| 5,338,010 | * 8/1994 | Haupt | 280/124.112 |
| 5,368,322 | 11/1994 | Korpimaa . | |
| 5,388,857 | 2/1995 | Wernimont et al. . | |
| 5,447,331 | 9/1995 | Barnhart . | |
| 5,449,194 | 9/1995 | Wernimont et al. . | |
| 5,639,119 | * 6/1997 | Plate et al. | 280/754 |
| 5,735,540 | * 4/1998 | Schiffler | 280/689 |

\* cited by examiner

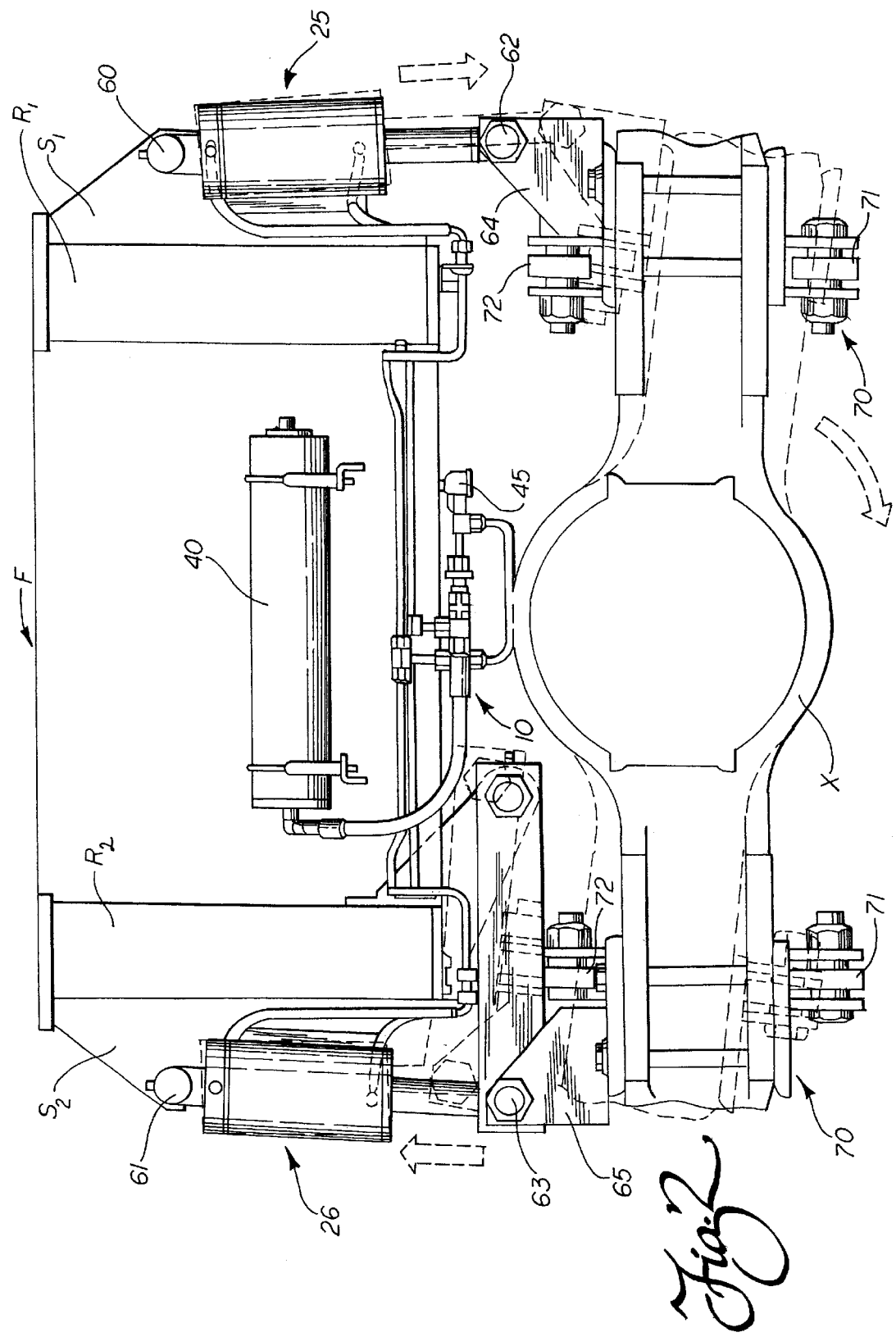

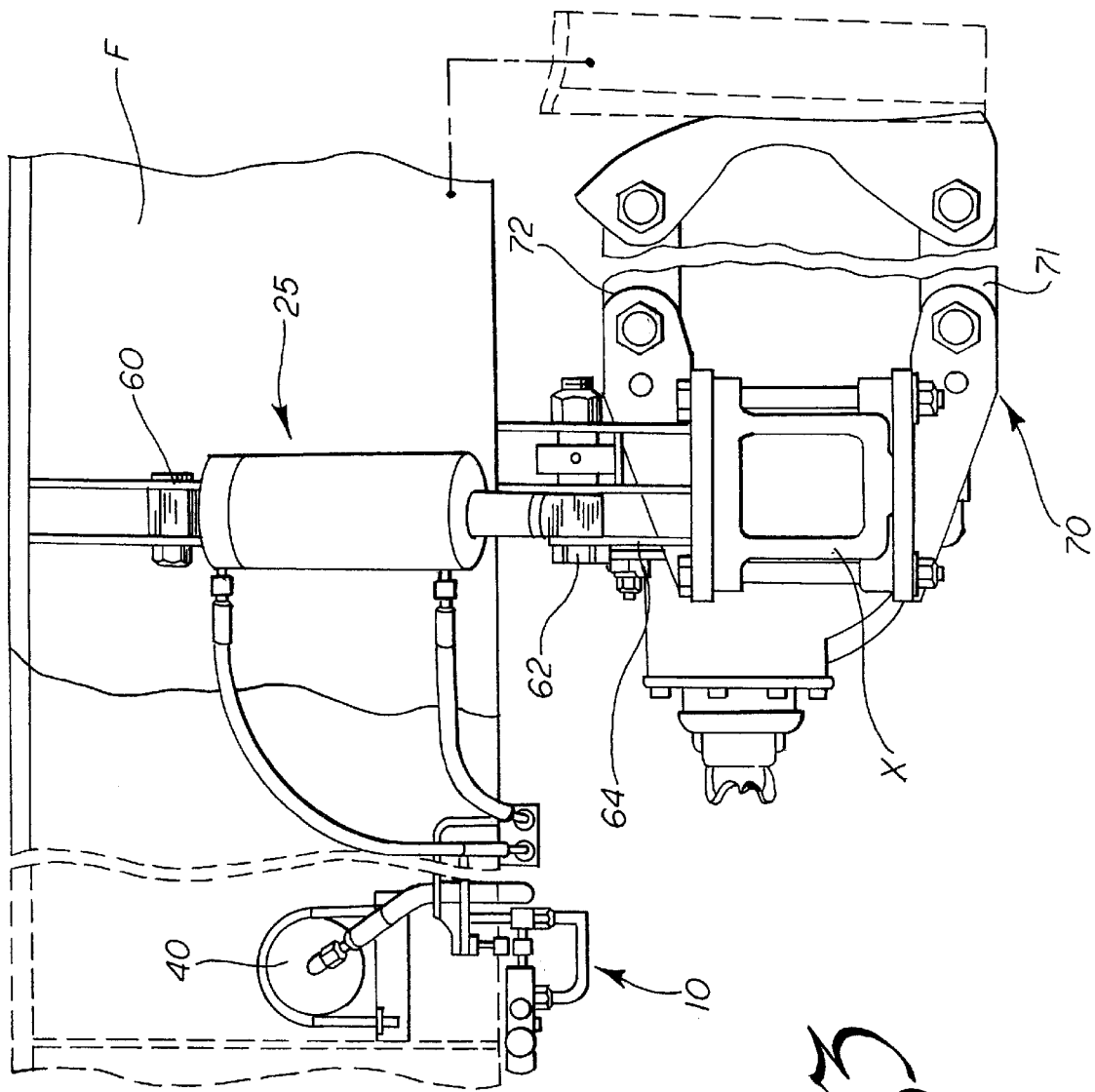

SUSPENSION SYSTEM WITH AXLE OSCILLATION CIRCUIT

TECHNICAL FIELD

The present invention relates to suspension of a vehicle, and more particularly to a suspension for a heavy duty, mobile working vehicle, such as a crane or excavator, wherein a hydraulic oscillation circuit allows a cushioned ride during the travel mode of operation, and a stabilized platform by fluid trapped in the cylinders during a working mode of operation.

BACKGROUND OF THE INVENTION

For heavy duty material handling vehicles, it is known to provide suspension systems utilizing hydraulic support cylinders, either in an independent or semi-independent mounting arrangement. The objective is to provide a cushioned ride during the traveling mode of operation through the use of the cylinders and a stabilized suspension for the vehicle during the working mode of operation. For the traveling mode, it is known to provide pneumatic/hydraulic accumulators to provide a cushioning effect. Typically, the cylinders are coupled with transfer lines for moving the hydraulic oil between the extend and retract sides of the individual cylinders. It is also common to trap oil in the extend sides of the cylinder in order to provide a stabilized vehicle platform during the working mode of operation, such as during lifting a load by a crane or the use of a bucket on an excavator to dig.

One of the earliest examples of the suspension system of the type described is found in the Peiffer U.S. Pat. No. 3,550,993, issued Dec. 29, 1970. In this arrangement, the hydraulic circuit is capable of trapping fluid in the cylinders on the extend side for working. During the travel mode, fluid is exchanged between the extend and retract sides of each individual cylinder. However, a true oscillating motion is not possible since each pair of cylinders for either the front or rear axles are not coupled together. With such an arrangement, maintaining a level positioning of the vehicle is more difficult, and to compensate for this shortcoming, the use of level regulation valves operating continuously to modify the supply of hydraulic oil to all four cylinders of both axles is required. The complexity of the suspension system of the type in the '993 patent leaves much to be desired.

A later approach set forth in U.S. Pat. No. 4,174,854, issued Nov. 20, 1979, provides an advance in that an oscillation of the front and/or rear axle is provided through a modified hydraulic circuit. However, as in the '993 patent, constant monitoring of the height and the attitude of the vehicle is required to operate level regulation valves. In order to provide a stabilized suspension system for the working mode of operation, the '854 patent teaches rigidly locking the frame to the axle. A similar arrangement is found in the U.S. Pat. No. 5,368,322 issued Nov. 29, 1994, and this patent is one of the first to teach the use of a 4-bar assembly in the suspension to limit lateral axle movement in a hydraulic cylinder suspension system.

In more recent years, there have been several hydraulic circuits for automotive suspension systems designed to work as helpers for a basic mechanical spring system, such as U.S. Pat. No. 5,449,194, issued Sep. 11, 1995. These patents follow a reasonably long line of developments in this particular field and are directed in large part to combined systems, such as for working in concert with the brakes of the vehicle. For a proper operation, an even more complex system, such as with multiple pneumatic supply reservoirs and control valves, are required.

In each of the above described suspension systems, the nature of the operation requires extra complexity in terms of the mechanical structure, as well as the hydraulic and pneumatic circuits to control the support cylinders. Furthermore, even with the more complex circuitry, the operation of the system has been found to need improvement. In particular, there has been little progress in the development of a suspension system for the rear axle of a heavy duty vehicle that matches a superior cushioned ride in one mode, with a more stabilized working platform in the other mode. An arrangement that provides a more cushioned ride in the traveling mode of operation is needed in order to relieve the stress and fatigue of the operator. This system should also minimize the mechanical stress on the frame and the other vulnerable components of the vehicle. It would be desirable to maintain a simulated oscillating movement. This allows elimination of the center pin, bolster and the reinforced axle frame. The center of the vehicle would be opened with free space. Not only would there be a considerable initial cost savings and significant weight savings, but also better access to the engine of the vehicle and other components would result. Thus, the need for the present improved suspension system combinating these changes is apparent.

SUMMARY OF THE INVENTION

Accordingly, it is a primary object of the present invention to provide a suspension system simulating the bolster and pin type oscillation, but the system is provided with an enhanced cushioning effect in the traveling mode of operation, and a more stabilized platform during the working mode of operation.

It is another object of the present invention to provide a suspension system wherein semi-independent support of the rear axle of a heavy duty, working vehicle simulates the center pinned bolster arrangement, but provides for enhanced performance at a lower initial cost, a substantial weight savings and better access to the vehicle engine and other components, along with other benefits.

It is still another object of the present invention to provide an improved suspension system wherein the interaction between the hydraulic circuit and the electrical control circuit assures efficient operation in either mode, as well as switching from one to the other.

It is still another object of the present invention to improve the cushioning capability of the system in the travel mode, by utilizing less components in the hydraulic oscillation circuit. For example, in a preferred embodiment, a single accumulator and a return line bypass to the hydraulic oil reservoir eliminates the need for a second accumulator. Furthermore, using a piston and cylinder type accumulator provides a lower spring rate to extend the performance range in the traveling mode of operation for maximizing stress relief.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved suspension system with an axle oscillation circuit that simulates bolster center pinned oscillation motion is provided. The suspension is best adapted for use on a heavy duty crane, excavator or other material handling vehicle that requires cushioning of the ride in the traveling mode of operation, and then stabilizing of the vehicle to form a secure platform during a working mode. The system of the present invention is best adapted for a wheeled vehicle and is usually applied to the rear axle. During traveling, such as from job site to job site, or even for a pick and move operation at a job site, the rear axle can oscillate when uneven terrain is encountered. Not only is the ride cushioned to relieve stress and fatigue of the operator, but also to minimize the stress of the mechanical parts of the vehicle.

A hydraulic pressure source is connected through a set up valve to provide hydraulic control of the level of the vehicle frame with respect to the wheels. The set up valve includes a pressure feed line connected to the extend side of the hydraulic cylinders and a return line connected to the retract side and a reservoir. A standard hydraulic pump, such as used in steering systems can be used as the pressure source and reservoir and is mounted in the vehicle above the level of the hydraulic circuit so that there is continuous back pressure potential through the return line.

In the preferred embodiment illustrated, a rear axle is provided with hydraulic support cylinders, each including a piston with a piston rod that is attached adjacent the ends of the transverse axle. Upon applying differential pressure through the feed/return lines, the height of the vehicle frame with respect to the axle can be selected; it being understood that an approximate mid-positioning of the pistons in the support cylinders is selected in most instances of operation.

Within the hydraulic circuit according to the present invention, an exchange line is provided between the extend sides of the cylinders for hydraulic oil transfer and thus provide the desired oscillation motion of the axle. A connect line is provided to transfer oil between the retract sides of the cylinders. A first and second locking valve, preferably mounted in the respective support cylinders on the extend sides (case ends) serves to block the oil flow through the exchange line to trap oil, thus providing the vehicle as a stabilized platform in the working mode of operation.

An electrical control circuit serves to actuate the locking valves to open the exchange line when the travel mode of operation is implemented. Once the locking valves are open, at least a portion of the trapped oil in the extend sides of the cylinders communicates with an accumulator connected to the exchange line, thus turning the support cylinders into shock absorbers for cushioning the ride of the vehicle. It is an advantage that the axle oscillates in a manner to simulate the prior center bolster and pin arrangement of the prior art, but does so in a more effective and enhanced manner.

As another feature the present invention, a third locking valve is provided in a bypass return line connected to the connect line between the retract sides of the support cylinders. This valve serves to block flow to the reservoir during the working mode of operation. However, upon being actuated by the control circuit simultaneously with the first and second locking valves, the third locking valve connects to the reservoir, thus establishing low pressure on the retract sides of both support cylinders. The constant low pressure serves to help lower the spring rate in the support cylinders, thus further enhancing the cushioning effect during the travel mode. By maintaining this minimum head of pressure to the retract sides, cavitation within the cylinders is also prevented.

As another feature of the preferred embodiment of the present invention, an interrupter switch is provided in the control circuit, which can be independently operative to maintain the valves closed and the oil trapped in the extend sides of the cylinders during the working mode of operation. For example, if the boom on a crane is moved out of its normal travel position, the control circuit cannot operate to initiate the travel mode. Furthermore, each of the locking valves are spring biased to the closed position so that at all times, including any time that the hydraulic or electric control circuits are inoperative, the stabilized working mode is maintained. In this way, the control circuit and the hydraulic circuit cooperate in a new, interactive manner to assure maximum operational advantage.

The accumulator is preferably a piston type to allow the desirable increased range of oscillation, and thus further enhance axle movement and ride cushioning. As opposed to the restraint offered by a rubber diaphragm in a diaphragm type accumulator, the piston is allowed freer movement for better cushioning effect. In order to prevent an over pressure condition in the hydraulic circuit, an auxiliary return line is included in the set up valve to allow independent flow of hydraulic oil from the cylinders on the retract sides. A check valve with a pilot-to-open valve is responsive to any over pressure condition, such as may be caused by heat built up during travel or the like.

As mentioned above, the elimination of the bolster and center pin arrangement attaching the axle to the vehicle frame, frees up the space above the rear axle. The support cylinders are pivotally mounted on carrier frames outboard of the main frame rails of the vehicle. In addition to freeing up the space for better access to the engine of the vehicle and other drive components, substantial cost benefits and weight savings are realized. In addition, a pivotal 4-bar assembly is positioned under the frame rails in a manner to limit lateral motion of the axle, but to maintain the center of the vehicle open for access to the engine and drive components for maintenance. With the bolster and the need to reinforce the center of the vehicle frame removed, a convenient space is provided for mounting the hydraulic circuit, including at least the operating components adjacent the cylinders, the third locking valve and the accumulator. The first and second locking valves are mounted in or on the respective cylinders to maintain maximum trapping efficiency of the hydraulic oil in the working mode of operation.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 2 is a cross sectional view through a typical installation of the suspension system of the present invention illustrating the positioning of the rear axle with the free space above and the mounting of the components of the system on the vehicle frame; and FIG. 3 is a side view of the section of the vehicle shown in FIG. 2 and with some component parts broken away for clarity.

Figure 1:
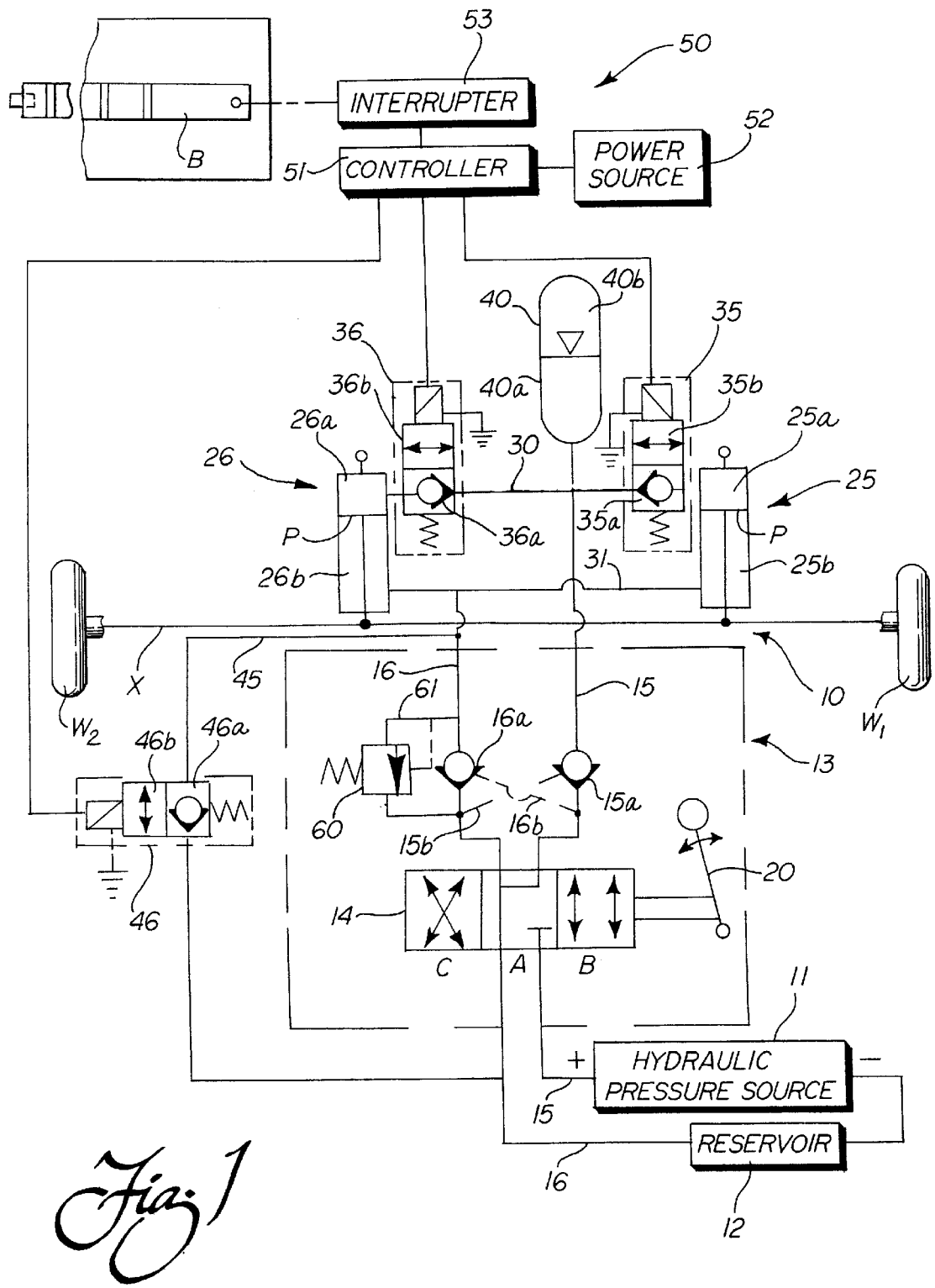
FIG. 1 is a schematic diagram of the suspension system with the rear axle hydraulic oscillation circuit of the present invention.

Reference will now be made in detail to the present preferred embodiment of the invention, an example of which is illustrated in the accompanying drawings.

DETAILED DESCRIPTION OF THE PREFERRED EMBODIMENT

Reference is now made to FIG. 1 of the drawings illustrating the improved suspension system of the present invention for a material handling vehicle, such as a crane, excavator or other heavy duty working vehicle, and including a rear axle X with a wheel $W_1$, $W_2$ mounted on each end thereof. In the instance where the suspension system is used on a heavy duty hydraulic crane, a boom B is provided for performing work in the known manner. In the instance where the suspension system is used on an excavator, the boom B is of course replaced with an extendable arm with a bucket for digging and lifting. It should also be understood that while the present invention in its preferred embodiment is being described on a heavy duty working vehicle for handling material in the form of a crane and excavator, other suitable uses of the suspension system will be apparent to those of skill in the art.

Thus, in the preferred embodiment, a hydraulic control circuit, generally designated by the reference numeral 10, includes a hydraulic pressure source 11 and a reservoir 12, which in practice is mounted at an upper location in the vehicle, and can be either independent, or adapted to service other operating systems in the vehicle, such as the power steering system. An important part of the hydraulic control circuit 10 is a hydraulic set up valve 13, which is typically mounted in the cab of the vehicle. A 3-way control valve 14 serves to direct the fluid through a pressure feed line 15 to the remainder of the circuit 10, and then back through return line 16. In position A of the valve 14, both the pressure feed line 15 and the return line 16 are open to the reservoir 12 to provide a drain path for the hydraulic oil, including for any leakage.

The three way valve 14 can be shifted to a position B by a joy stick type lever 20 in the cab, and in this position positive flow is established along the feed line 15 and return flow is established along the full length of the return line 16. Check valve 15a in the feed line is open by its own positive pressure and check valve 16a is opened by the pilot-to-open line 16b. Thus, in this B position of the 3-way valve 14, positive pressure is established through the set up valve 13 to feed line 15 and low pressure established by the head of hydraulic oil in the reservoir 12 is established along the full length of the return line 16.

As will be seen more in detail below, when the valve 14 is in position B as just described, the frame of the vehicle (not shown) will be raised with respect to the axle X. Of course, the other or C position of the 3-way valve 14 is for reversing the flow through the check valves 15a, 16a so that the pressure source 11 can be connected to lower the frame of the vehicle with respect to the axle X. To accomplish this function the pressure feed line 15 connects through the return line 16, pressurizes the pilot to open line 15b to open the check valve 15a, and hydraulic oil is drained from the line directly to the reservoir 12.

In accordance with the present invention, a pair of support cylinders, generally designated by the reference numerals 25, 26 are provided and interconnected with the hydraulic control circuit 10 and form an essential part of the inventive suspension system of the present invention. The cylinders 25, 26 include extend sides 25a, 26a and retract sides 25b, 26b, respectively. As is well understood, the extend and retract sides 25a, 25b and 26a, 26b are formed by the piston P in each cylinder 25, 26, respectively. The extend side of the cylinders is at the case end; whereas, the retract side of the cylinders is at the rod end, as illustrated in FIG. 1. The rod end of the pistons is pivotally attached to the axle adjacent the respective ends, as noted, and as will be further described below.

An exchange line 30 directly connects the extend sides 25a, 26a and a connect line 31 provides communication between the retract sides 25b, 26b of the cylinders. This provides for transfer of hydraulic oil from the corresponding extend sides of the first cylinder 25 to the second cylinder 26 to allow oscillation of the axle X during the travel mode of the vehicle. Any oil transferring out of one cylinder 25, 26, due to hitting a bump by its respective wheel $W_1$, $W_2$, flows into the other cylinder to balance the movement and maintain these wheels, as well as the front wheels (not shown) on the ground and without stressing the frame.

Preferably housed within or adjacent the case end of the first and second support cylinders 25, 26 is a respective electric solenoid valve 35, 36. As illustrated, these valves are thus interconnected to the respective extend sides of the cylinders and because of check valve sections or components 35a, 36a, respectively, hydraulic oil flow through the exchange line 30 is normally blocked. A spring (not numbered) in each valve 35, 36 assures that the default position is the blocking position. In the other position of the valve, the extend sides 25a, 26a are opened, as described above, to thus allow flow between the two support cylinders 25, 26.

As is apparent, in the blocked condition of the exchange line 30, the vehicle provides a stabilized working platform to allow safely operating the boom B of a crane, or the equivalent working component of an excavator or other earth working or like machine. In the flow through position of the valves 35, 36, the hydraulic oil is transferred in a highly efficiently manner from one extend side 25a, 26a to the other allowing oscillation movement of the axle X, whereas either wheel $W_1$, $W_2$ and thus the vehicle can accommodate any raised bump or recessed rut in its travel in a highly efficient manner.

Connected to the exchange line 30, as well as to the pressure feed line 15 of the set up valve 13, there is provided a hydraulic/pneumatic accumulator 40, for the purpose of cushioning the flow of hydraulic oil from the extend sides 25a, 26a in the travel mode of operation. The cushioning effect is enhanced in the preferred embodiment by the accumulator being a piston type, rather than a diaphragm type. The piston (not shown) within the accumulator 40 has a higher degree of freedom of movement from the hydraulic side 40a, toward the back pressure pneumatic side 40b. Because there is no built-in mechanical restraint as a result of the perimeter anchoring of a diaphragm, greater cushioning effect is thus realized. Accordingly, when the locking valves 35, 36 are shifted to position the flow through sections 35b, 36b, at least a portion of the hydraulic oil in the exchange line 30 flows into the hydraulic end 40a of the accumulator 40 to effect the desired cushioning of the ride of the vehicle during oscillation of the axle X in the traveling mode of operation.

In accordance with another aspect of the present invention, when the extend sides 25a, 26a of the support cylinders are opened to exchange hydraulic oil, the oil on the retract sides of the cylinders is directed through the connect line 31 to a bypass return line 45 that is controlled by a third locking valve 46, which is identical to the locking valves 35, 36 with a check valve section 46a and a flow through section 46b. As will be seen in detail immediately below, when the valves 35, 36 are shifted so that the cushioning mode can occur, the third locking valve 46 is simultaneously shifted so that the hydraulic oil on the retract sides 25b, 26b can communicate with the low pressure in the return line 16, as provided by the head established by the reservoir 12. With the valve 46 held open, there is a freedom of flow at low back pressure between the reservoir 12 and the retract sides 25b, 26b through the return lines 16, 45 and deleterious cavitation is prevented. Also, in this way, with the minimum back pressure present, the cushioning effect of the accumulator 40 is even further enhanced. There is little restriction from the retract sides 25b, 26b of the support cylinders, thus providing the increased, but controlled, oscillating movement of the axle X.

An electrical control circuit 50 is provided to operate the three locking valves 35, 36, 46. As illustrated in FIG. 1, a controller 51 may be used and is connected to the solenoid of each valve so as to be capable of simultaneous actuation, as desired. In other words, when exchange flow between the support cylinders 25, 26 is to be established for the travel mode of operation, the first and second valves 35, 36, and the third or bypass valve 46, are all opened to provide freedom of movement of hydraulic oil in and out of both the extend and retract sides of the cylinders. The controller 51 can take the form of a switch for simply connecting and disconnecting electric power source 52 with respect to the solenoids. An interrupter 53, which can take the form of a heavy duty switch, such as a cam operated switch connected to the pivot of the boom B serves to disable the controller 51 in the event that the boom is in any position other than aligned in the travel position. This feature insures that if the boom B is turned to an off-center or working position where the vehicle would be unstable, all of the valves 35, 36, 46 are closed to block flow in response to the spring biasing, and thus the stabilized mode of the suspension system is immediately locked in and maintained. This cooperative interaction of the hydraulic and electrical circuits 10, 50 provides a suspension system that is not only simple and easy to operate, but is failsafe in the event of disabling of either circuit for any reason.

Under certain conditions of extended travel, heat built-up in the support cylinders 25, 26 can occur and under these conditions it is important to relieve the pressure through the return line 16 by a pilot-to-open valve 60 in auxiliary return line 61 that bypasses the check valve 16a. Thus, in operation, if an increase in pressure develops on the retract sides 25b, 26b, the increased pressure is relieved by flowing around the check valve 16a to the return line 16 and to the reservoir 12. Of course, during this travel mode of operation the extend sides 25a, 26b are connected to the accumulator 40 and thus any increased pressure on this side of the pistons P of the cylinders 25, 26 is likewise accommodated.

With reference now to FIG. 2 of the drawings, a clearer understanding of the physical positioning of the components of the suspension system can be seen. A partially schematic, transverse cross section of a typical vehicle of the crane or excavator type is provided. In particular, a frame F including longitudinal main frame rails $R_1$, $R_2$ support outboard carrier frames $S_1$, $S_2$, respectively. The support cylinders 25, 26 are mounted on the respective carrier frames $S_1$, $S_2$ by pivot pins 60, 61. The rods of the pistons P within the cylinders 25, 26 are connected by pivot bolts 62, 63 that are held in axle sub-frames 64, 65 (see also FIG. 3).

As will be apparent, in the travel mode of operation, the axle X oscillates substantially freely about its center axis, as shown by the dotted line position and the three action arrows. The oscillating motion accommodates any irregular terrain that is encountered by either wheel $W_1$, $W_2$ (axle X cut away at the ends in FIGS. 2, 3, but see FIG. 1). As will be noted, since the center of the axle X is not pinned, and there is no bolster or reinforcement of the frame F, the weight of both the axle and the frame is substantially less than in the prior art arrangements. As such, the axle X is also freer to oscillate. It simulates the prior desirable action that is proven to be desirable, but without the drawbacks.

The lateral movement of the axle is controlled efficiently through a 4-bar guide assembly, generally designated by the reference numeral 70 (see FIG. 3). This guide assembly comprises a pair of pivotal links 71, 72 that are anchored by an extension of the vehicle frame F (see dashed line showing in FIG. 3). Thus, as the axle oscillates, as illustrated by the dashed line arrows in FIG. 2, the links 71, 72 on both sides shift up and down in a controlled manner to allow the up and down, pivotal freedom of action necessary, but to restrict lateral or side-to-side movement.

Without the bolster and frame reinforcement to provide a pivotal mounting of the axle X, the space above the axle is opened up and accessible (see FIG. 2). As can best be visualized by viewing this Figure, as well as FIG. 3, this free space allows substantially greater access to the engine and other driving and operating components that are normally positioned in the area of the rear axle X (such as between the vehicle frame rails $R_1$, $R_2$). Thus in addition to a substantial savings in weight over the prior art arrangements, better efficiency for maintenance of the vehicle is realized. Furthermore, the freed-up space can be utilized to position the major portion of the suspension system, including the components of the hydraulic circuit 10 in close proximity to the support cylinders 25, 26. This cuts down on the plumbing costs, as well as eliminates functional delays due to long hydraulic lines. Also positioned in this manner, the components of the circuit are well protected within one of the most reinforced sections of the vehicle.

As best shown in FIG. 2, the bulk of the individual components of the hydraulic control circuit 10 (except for the set up valve 13) including the exchange and connect lines 30, 31, the third locking valve 46 and the bypass return line 45, as well as the accumulator 40 are mounted with advantage in this manner. As indicated previously, the locking valves 35, 36 are preferably housed within the respective support cylinders 25, 26, and are thus not illustrated in FIGS. 2 and 3.

In view of the foregoing description and the illustration in the drawings, the results and the advantages of the suspension system of the present invention can now be more fully realized. The hydraulic oil in the circuit 10 is controlled in a manner to maximize the exchange between the extend sides 25a, 26a of the support cylinders 25, 26 in a manner to enhance the cushioning ride capability of the vehicle. This is done while maintaining the desirable oscillation of the axle X that closely simulates the prior art arrangements where a bolster center pinned structure is required. Not only is there improved efficiency of operation, but substantial savings in initial expense and weight are also byproducts of this feature of the present invention. To actuate the locking valves 35, 36 and 46 for the traveling mode of operation, an electrical circuit 50 is utilized with advantage. An interrupter switch 53 within the circuit 50 prevents switching to the travel mode any time that the boom B, or similar working component of the vehicle, is moved out of the travel position. The accumulator 40 is a piston type to provide the lower spring rate, that thus results in the increased cushioning and less fatiguing ride for the operator. Whereas in the past additional accumulators are needed, such as on the retract side of the cylinders 25, 26, the present invention contemplates only one. To accomplish this, the retract sides 25b, 26b of the cylinders are connected to the reservoir 12 through the locking valve 46. The pilot to open relief valve 60 prevents a high pressure rise due to heat or other abnormal events, especially during extended travel of the vehicle. The opening of the space above the rear axle X provides substantial advantages for maintenance, as well as a convenient location for mounting of the hydraulic circuit components.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A suspension system for a mobile material handling vehicle, including a transverse axle with a wheel on each end; comprising:

a hydraulic pressure source providing operating hydraulic oil flow connecting through a set-up valve with a pressure feed line, and a reservoir connecting through said valve to a return line;

a pair of hydraulic support cylinders, each including a piston and having an extend and retract side;

one of said support cylinders mounted adjacent each end of said axle for permitting the axle to oscillate substantially freely in a traveling mode of operation;

an exchange line and a connect line to the extend and retract sides of said cylinders, respectively, for transferring the hydraulic oil therefrom to allow oscillation of said axle;

a first and second locking valve in said exchange line interconnected to the respective extend sides of said cylinders to block the hydraulic oil flow through said exchange line to trap the oil and stabilize the vehicle in a working mode of operation;

a hydraulic/pneumatic accumulator communicating with said exchange line; and a control circuit for actuating said locking valves to open said exchange line, whereby when said valves are open at least a portion of the trapped oil in said extend sides communicates with said accumulator for cushioning said vehicle during oscillation of said axle in the traveling mode of operation.

2. The suspension system of claim 1, wherein is further provided a third locking valve in a by pass return line connected to said connect line to block flow from the retract sides of said cylinders to said reservoir; said control circuit serving to actuate said third locking valve simultaneously with said first and second locking valves, whereby when said valves are open the oil in said retract sides communicates with said reservoir to maintain back pressure and prevent cavitation.

3. The suspension system of claim 1, wherein is provided an interrupter switch in said control circuit and being operative to maintain said valves closed and the oil trapped in the extend sides of said cylinders during the working mode of operation.

4. The suspension system of claim 3, wherein said control circuit includes an electrical solenoid for each valve for actuation, an electric power source and a controller.

5. The suspension system of claim 4, wherein said valves include a spring biasing said valves to a locking position, whereby said axle is maintained in the working mode in the event of hydraulic or electric power loss.

6. The suspension system of claim 1, wherein said accumulator communicates with said pressure feed line of said set-up valve.

7. The suspension system of claim 2, wherein said support cylinders being pivotally mounted between respective carrier frames outboard of first and second main frame rails of the vehicle and the corresponding ends of the axle; a center of said axle between said frame rails being free of attachment for enhanced oscillation and a pivotal assembly positioned under said frame rails attached to said axle to limit lateral movement of said axle.

8. The suspension system of claim 7, wherein at least said set-up valve, said third locking valve and said accumulator being mounted in a free space above the center of the axle and between the frame rails.

9. The suspension system of claim 8, wherein said first and second locking valves are mounted on the respective cylinders.

10. The suspension system of claim 1, wherein said set-up valve is three-way to selectively differentially pressurize said cylinders on the extend side by the hydraulic oil flow to raise the vehicle, differentially pressurize on the retract side by the flow to lower the vehicle and block the flow through said control valve to maintain a selected height during the working and traveling modes of operation.

11. The suspension system of claim 1, wherein said accumulator is a piston type to allow increased range of oscillation of said axle and ride cushioning.

12. The suspension system of claim 1, wherein said set-up valve includes a check valve and an auxiliary return line to allow flow from said cylinders on the retract sides to said reservoir and a pilot-to-open valve responsive to overpressure in said return line, whereby protection from excess pressure due to heat build-up is provided.

13. A suspension system for a mobile material handling vehicle having a frame, comprising:

a transverse axle with a wheel on each end, said axle having a center being free of direct attachment from the vehicle frame;

a hydraulic pressure source providing operating hydraulic oil flow connecting through a set-up valve with a pressure feed line, and a reservoir connecting through said valve to a return line;

a pair of hydraulic support cylinders, each including a piston and having an extend and retract side, one of said support cylinders mounted adjacent each end of said axle;

an exchange line and a connect line to the extend and retract sides of said cylinders, respectively, for transferring the hydraulic oil therefrom to allow said axle to oscillate in a traveling mode;

a first and second locking valve in said exchange line interconnected to the respective extend sides of said cylinders to block the oil flow through said line to trap oil and stabilize the vehicle in a working mode of operation;

a hydraulic/pneumatic accumulator communicating with said exchange line; and a control circuit for actuating said locking valves to open said exchange line, whereby when said valves are open at least a portion of the trapped oil in said extend sides communicates with said accumulator for cushioning said vehicle during the enhanced free oscillation of said axle in the traveling mode of operation.

* * * * *